(12) United States Patent
Schröter

(10) Patent No.: US 11,385,085 B2
(45) Date of Patent: Jul. 12, 2022

(54) ULTRASONIC FLOWMETER

(71) Applicant: SICK Engineering GmbH, Ottendorf-Okrilla (DE)

(72) Inventor: Gerry Schröter, Ottendorf-Okrilla (DE)

(73) Assignee: SICK ENGINEERING GMBH, Ottendorf-Okrilla (DE)

(*) Notice: Subject to any disclaimer, the term of this patent is extended or adjusted under 35 U.S.C. 154(b) by 197 days.

(21) Appl. No.: 16/911,015

(22) Filed: Jun. 24, 2020

(65) Prior Publication Data
US 2020/0408579 A1    Dec. 31, 2020

(30) Foreign Application Priority Data

Jun. 25, 2019 (EP) .................................. 19182327

(51) Int. Cl.
*G01F 1/66* (2022.01)
*G01F 1/667* (2022.01)
(Continued)

(52) U.S. Cl.
CPC ................ *G01F 1/662* (2013.01); *G01F 1/66* (2013.01); *G01F 1/667* (2013.01); *G01N 29/024* (2013.01);
(Continued)

(58) Field of Classification Search
CPC ............ G01F 1/662; G01F 1/66; G01F 1/667; G01N 29/024; G01N 29/222; G01N 29/223; G01N 29/22
See application file for complete search history.

(56) References Cited

U.S. PATENT DOCUMENTS 6,895,824 B2 *  5/2005  Ehrlich .................. G01F 1/662
                                                          73/861.26
2011/0079090 A1  4/2011  Kroemer et al.
(Continued)

FOREIGN PATENT DOCUMENTS

EP          2006646 A1    12/2008
EP          2759807 A1     7/2014
(Continued)

OTHER PUBLICATIONS

European Search Report dated Dec. 18, 2019 corresponding to application No. 19182327.7.

*Primary Examiner* — Benjamin R Schmitt
(74) *Attorney, Agent, or Firm* — Nath, Goldberg & Meyer; Jerald L. Meyer

(57) ABSTRACT

An ultrasonic flowmeter comprising a conduit in a support housing and at least two ultrasonic transducers in a measuring insert which can be inserted into the support housing and the conduit perpendicularly to the conduit. The conduit comprises a circular cylindrical receptacle with a diameter larger than the inside diameter of the conduit and a depth encompassing the inside of the conduit, for inserting the measuring insert into the conduit perpendicular to the flow direction. Four ultrasonic transducers are provided in a wall of the measuring insert, the transducers define at least two measuring paths which cross each other in top view. The transducers are arranged in the measuring insert wall such that ultrasonic signals emitted and received by the ultrasonic transducers on the measuring paths have a transit time difference th–tr dependent on the flow velocity v and/or the flow rate Q of a fluid flowing in the conduit.

7 Claims, 5 Drawing Sheets

Figure 1:
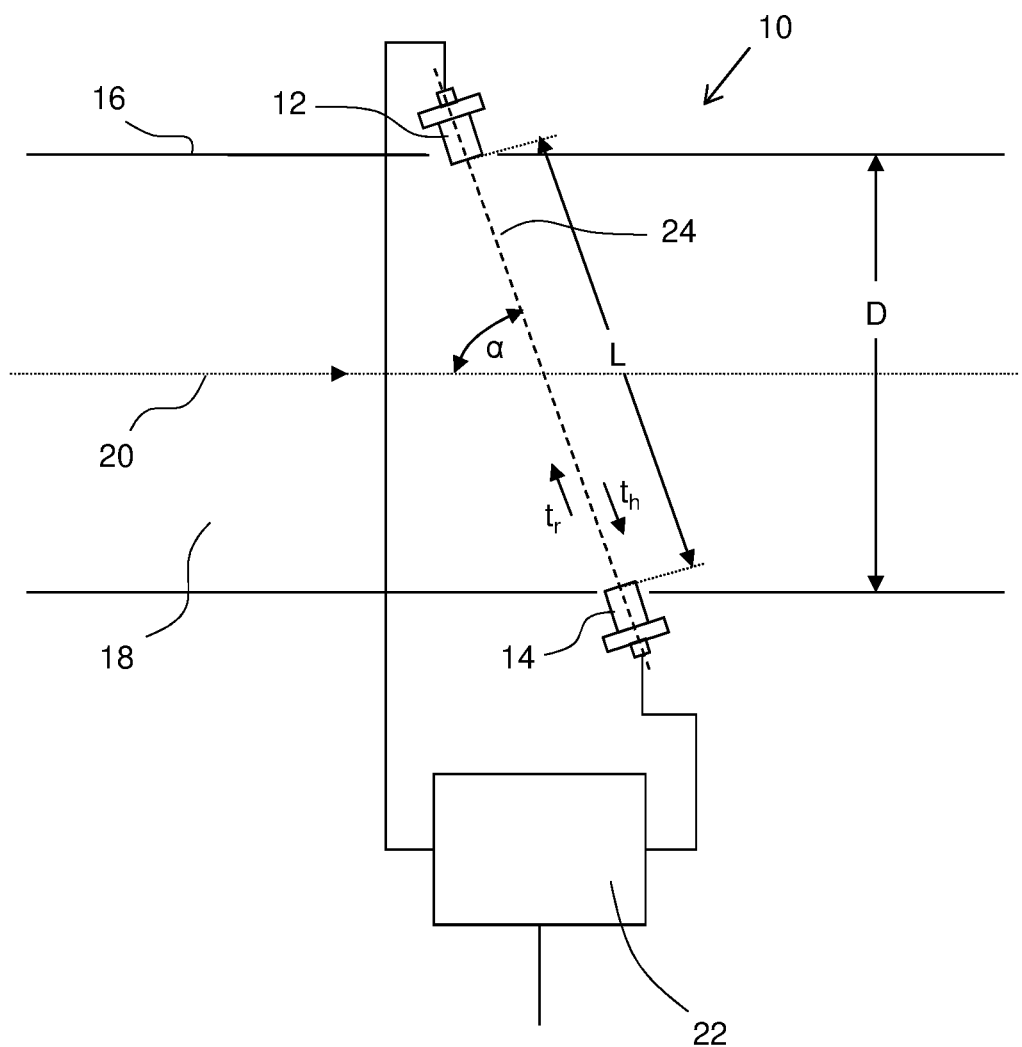

(51) Int. Cl.
*G01N 29/024* (2006.01)
*G01N 29/22* (2006.01)

(52) U.S. Cl.
CPC ......... *G01N 29/222* (2013.01); *G01N 29/223* (2013.01); *G01N 29/22* (2013.01)

(56) References Cited

U.S. PATENT DOCUMENTS

2011/0162462 A1* 7/2011 Allen ..................... G01F 1/662
73/861.18
2017/0030749 A1 2/2017 Joshi et al.

FOREIGN PATENT DOCUMENTS

| EP | 2146189 B1 | 10/2015 |
| GB | 2376529 A | 12/2002 |
| RU | 2647214 C2 | 8/2015 |
| WO | 2018011372 A1 | 1/2018 |
| WO | 2018073933 A1 | 4/2018 |

* cited by examiner

ULTRASONIC FLOWMETER

The invention concerns an ultrasonic flowmeter comprising a conduit in a support housing, the support housing forming the conduit wall, and at least two ultrasonic transducers arranged in such a way that in operation the flow rate measured by the two ultrasonic transducers has a transit time difference dependent on the flow velocity and/or the flow rate of a fluid flowing in the conduit, wherein the ultrasonic transducers are provided in a measuring insert which can be inserted into the support housing and removed from the conduit perpendicular to the conduit.

Such a flowmeter is known from the US 2011/0079090 A1. This flowmeter has a measuring insert which can be inserted vertically into a conduit. The ultrasonic transducers are attached to a cover. The insert has two reflectors lying on the central axis of the pipeline mounted on holders which extend through the conduit into the center. The ultrasound is reflected in order to pass from one ultrasonic transducer to the other via the two reflectors and in doing so travels a path between the reflectors in or against the direction of flow, so that a transit time difference can be measured.

This known device has the disadvantage that the reflectors and their holders extend into the flow and give rise to lots of turbulences. With such a device only rough measurements are possible. Accurate measurements (accuracy less than a percent) are principally not achievable. Such a device can only be used where accuracy is of no concern. In the oil and gas industry, where high accuracy is crucial, because small differences in the measurements amount to substantial amount of money due the huge quantities of oil or gas running through the pipe, the known device is not usable.

A further disadvantage is that the perturbation of the flow due to the holders and reflectors result in non reproducible measurements which is not tolerable in industry, especially in the oil and gas industry. Further, the measuring unit consists of several parts which makes the unit costly and hard to produce on a larger scale with a well defined and exact measurement geometry.

Another flowmeter is known from EP 2 006 646 A1. It has a design with a conduit in a support housing, whereby the support housing is designed as a conduit T-piece. The T-piece can be used in fluid conduits using two opposite flanges of the T-piece. An insert can be inserted into the conduit via a third opening of the T-piece. The insert has two ultrasonic transducers which are arranged in such a way that in operation the ultrasonic signals emitted and received by the two ultrasonic transducers have a transit time difference dependent on the flow velocity and/or the flow rate of a fluid flowing in the conduit. For this purpose, the insert has flattenings so that it fits through the opening. The inserted insert is then turned in the conduit via a selector shaft by 90° into its working position.

This known measuring device has a number of disadvantages. Due to its design as a T-piece with three nozzles and three flanges, it requires a very large space in the direction of the conduit axis. The third socket on the T-piece is used for inserting the insert. It requires a wall thickness that overlaps with the wall thickness required for the mounting threads for the conduit flanges. In order to avoid this, additional installation space in the direction of the conduit axis is required. Designs are always particularly critically that have to withstand high pressures. With the known arrangement, this can only be achieved by high material thicknesses and correspondingly stable flange connections, which result in very large installation space in the direction of the conduit axis.

Based on this prior art, it is an object of the invention to provide an improved ultrasonic flowmeter which requires in particular little installation space and is nevertheless designed for high pressures and is suitable for industry standard and easy production.

This object is solved by an ultrasonic flowmeter which comprises a conduit in a support housing, the support housing forming the conduit wall. At least two ultrasonic transducers are provided which are arranged in such a way that they are not in contact with the conduit wall, in that, in operation, the ultrasonic signals transmitted and received by the two ultrasonic transducers have a transit time difference which is dependent on the flow velocity and/or the flow rate of a fluid flowing in the conduit, the ultrasonic transducers being provided in a measuring insert which can be inserted into the support housing and into the conduit perpendicularly to the conduit and can be removed therefrom. According to the invention, for the purpose of inserting the measuring insert into the conduit, the conduit has a circular cylindrical receptacle perpendicular to the direction of flow, with a diameter greater than the internal diameter of the conduit and with a depth which encompasses the interior of the conduit. The measuring insert fits positively into the receptacle and has a passage which, when inserted, forms an extension of the inside of the conduit.

According to the inventive subject matter four ultrasonic transducers are provided in the wall of the measuring insert. The transducers define at least two measuring paths, said measuring paths crossing each other in top view. The transducers are arranged in the wall of the measuring insert in such a way that in operation the ultrasonic signals emitted and received by the two ultrasonic transducers on a measuring path have a transit time difference $t_h-t_r$ which is dependent on the flow velocity v and/or the flow rate Q of a fluid flowing in the conduit.

Since the support housing can be designed without its own flanges in the design according to the inventive subject matter, a considerable amount of installation space is saved. In principle, a cylindrical receptacle can be sealed inexpensively and easily by means of an O-ring. The geometry of the measuring insert and sealing cover can be produced cost-effectively by lathing. A circular geometry of the sealing cap which is made possible by this, allows the fastening elements of the cap to be arranged rotationally symmetrically. This ensures optimum force transmission of the retaining forces of the cover into the support housing. This makes it possible to keep the size of the fastening elements small, even for high pressures. This saves installation space.

By providing the hole directly into the support housing, no additional wall thickness is required for a connecting piece, as would still be necessary with a T-piece. This also saves installation space.

In the arrangement of the inventive subject matter, the wall thicknesses of the support housing must only be designed so thick that the threads in it provide sufficient support and resistance to the pressures that occur. This makes it possible to minimize the installation space, especially in the direction of flow. There are no interfering flanges. This means that the flowmeter requires only a small amount of conduit length, which allows for more versatile use.

In the inventive subject matter, four ultrasonic transducers are provided which form at least two measuring paths, the measuring paths crossing each other in topview. The measuring accuracy can be increased by several measuring paths. Firstly, because different flow cross-sections are then recorded and secondly because two different measurements give a more accurate overall result.

In an embodiment of the invention, the receptacle can be closed pressure-tight with a flangeless cover, for which purpose the support housing has threaded holes.

In a further embodiment of the invention, a sealing ring of the cover lies against the inside of a wall of the receptacle to seal the cover of the receptacle. Such a sealing by means of an O-ring in the same cylindrical diameter as the receptacle results in a small space requirement for the pressure-resistant closure of the mounting opening. No additional contact surfaces for seals are necessary. This saves installation space. In addition, the production is greatly simplified, because no special, additional sealing surfaces have to be provided, but only the one receptacle has to be lathed.

In an embodiment, the ultrasonic transducers are arranged off-centre in relation to a conduit axis. In this way, further installation space can be saved, because the ultrasonic transducers are then located in areas outside the largest transverse dimension of the interior of the conduit and thus in areas with higher wall thickness.

In an alternative measuring arrangement, the ultrasonic transducers lie in a reflective arrangement, i.e. an ultrasonic measuring path has at least one reflection off the wall. This allows the length of the measuring path to be increased, which is an advantage in signal processing when separating the signals.

To further improve the measuring accuracy, a flow straightener can be provided in the conduit on the inlet side.

In order to shorten the dimensions in the direction of the conduit, i.e. in the direction of flow, the support housing can be mounted directly to flanges of the fluid conduit on the inlet and outlet side for installation of the measuring instrument in a conduit.

Figure 2:
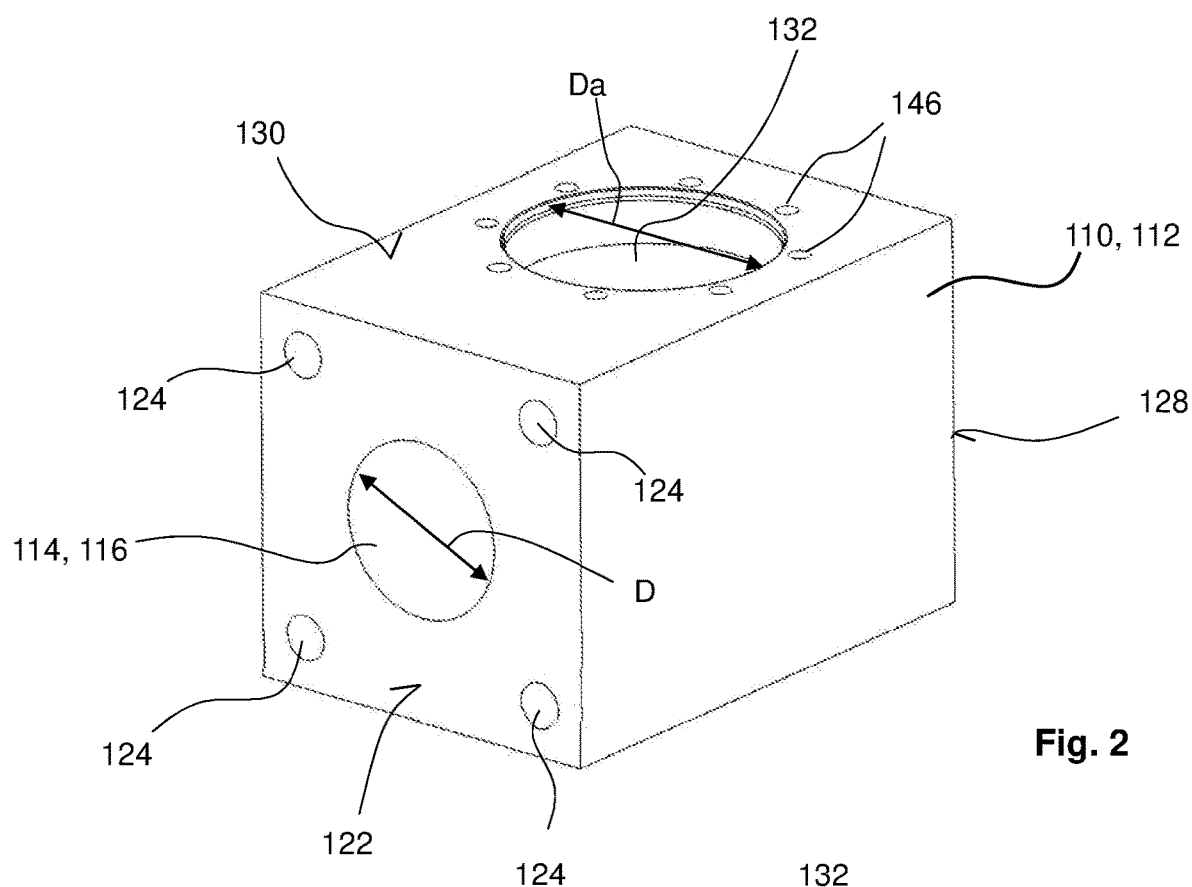
Figure 3:
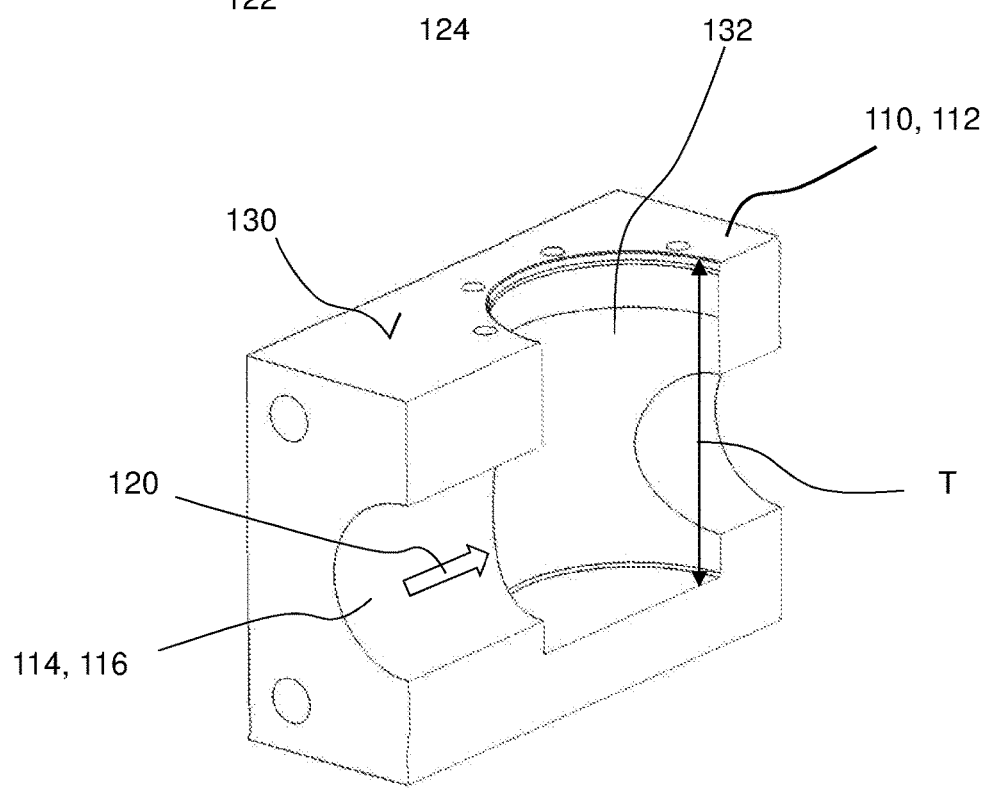
Figure 4:
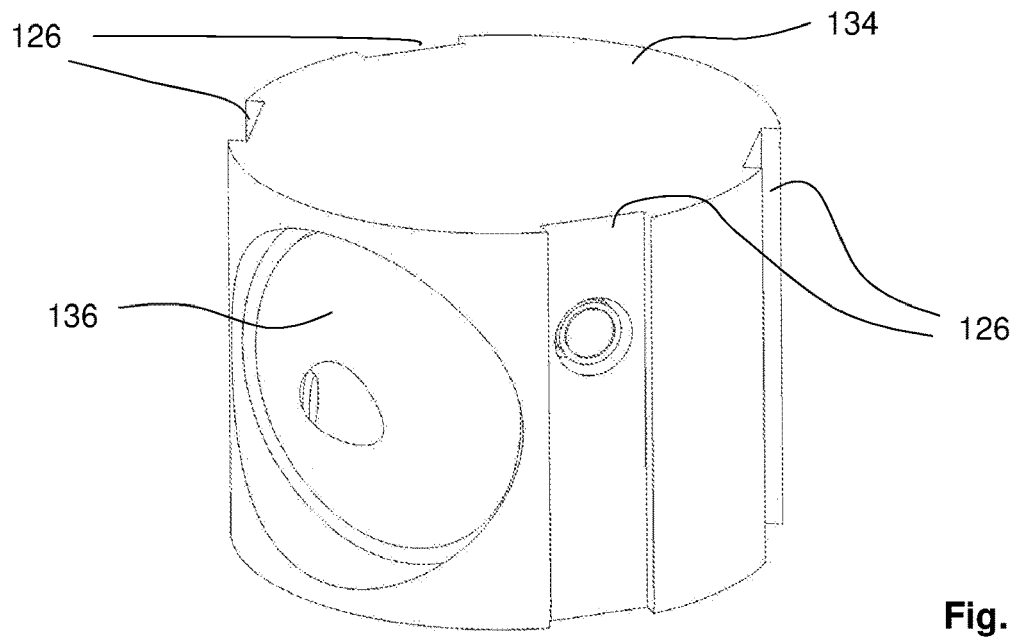
Figure 5:
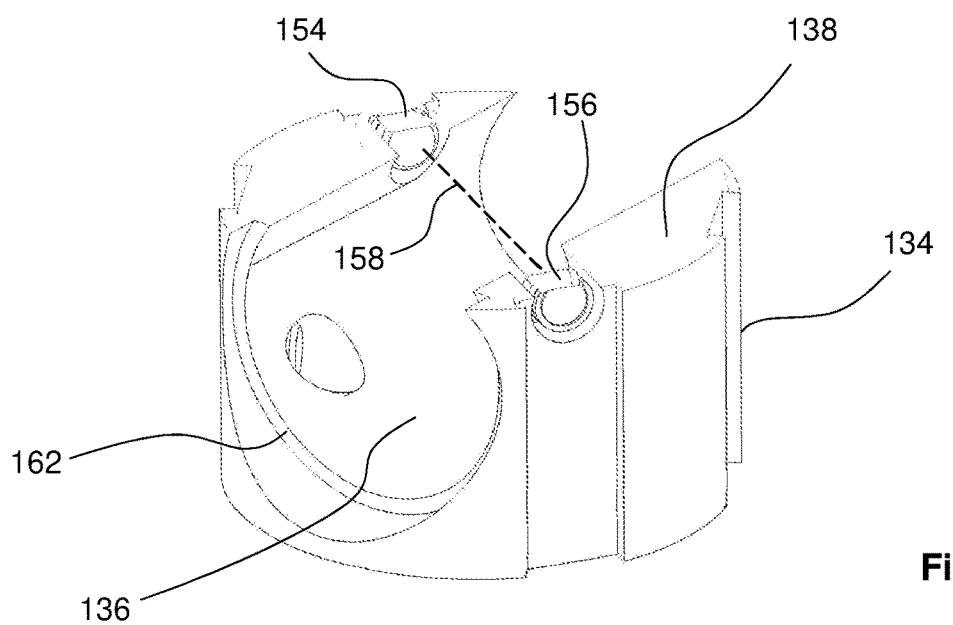
Figure 6:
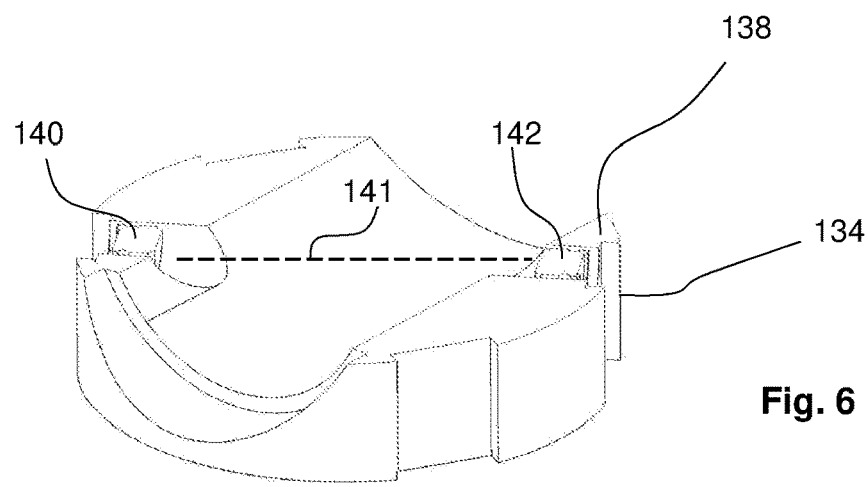
Figure 7:
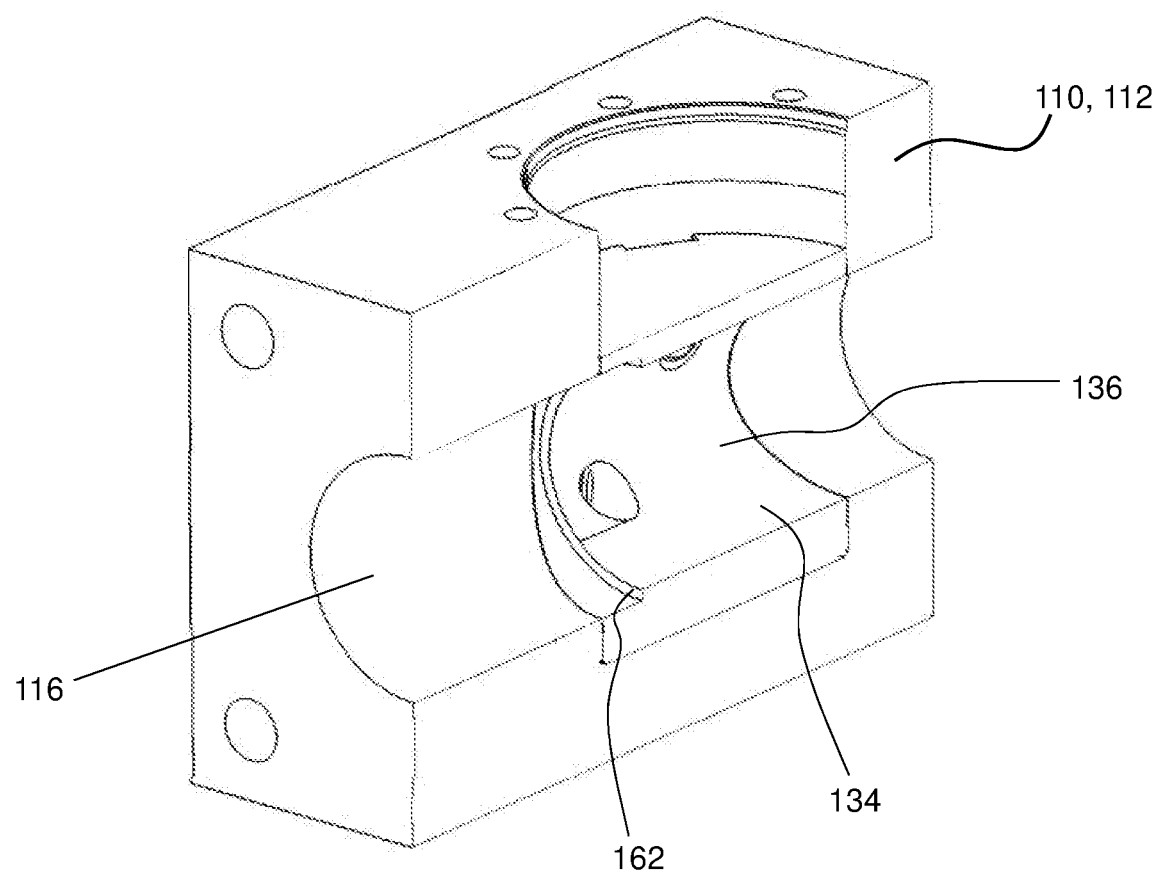
Figure 8:
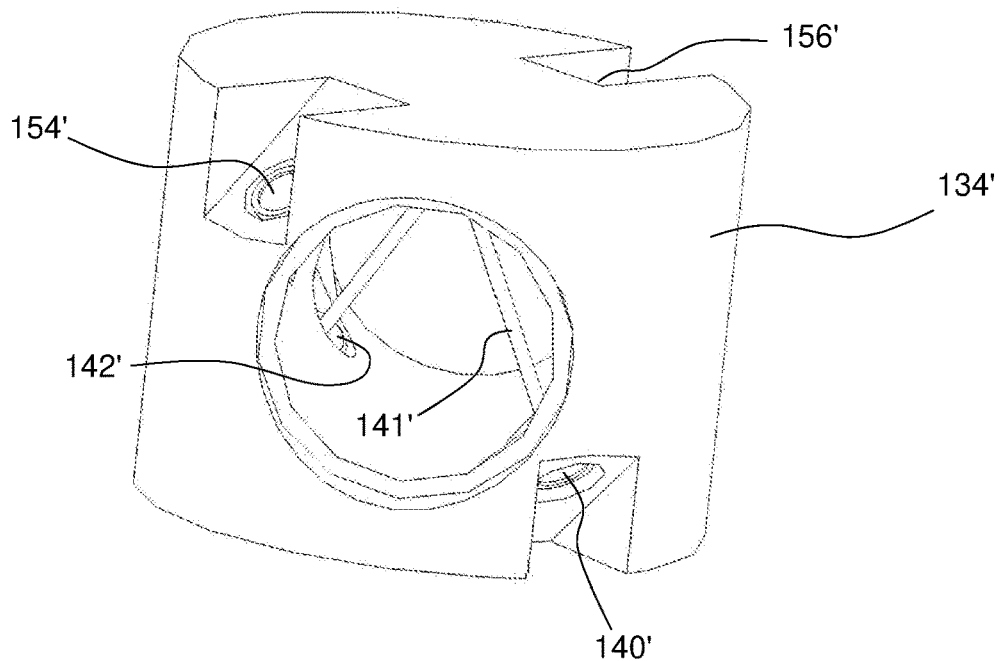
Figure 9:
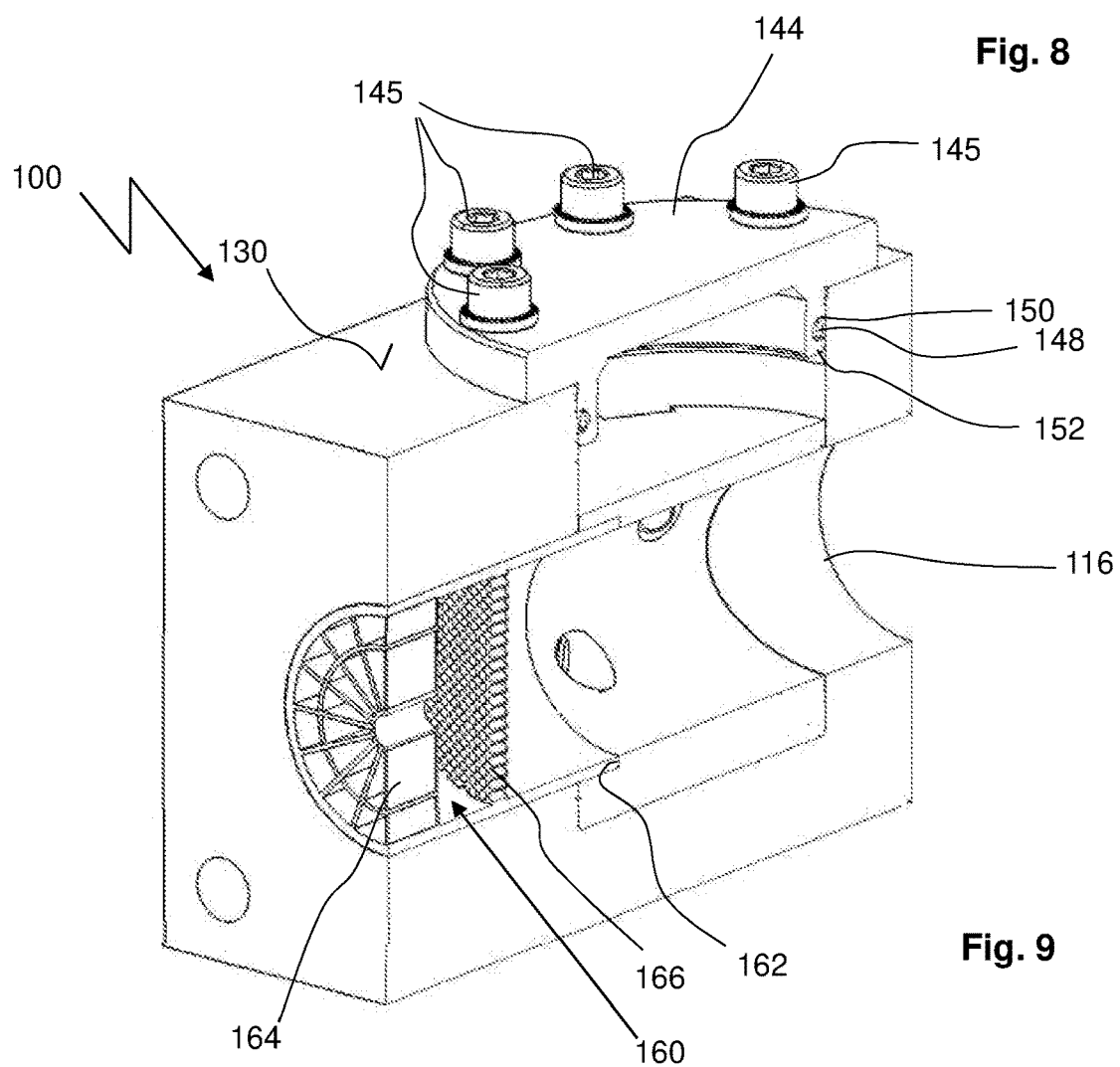

In the following, the invention is described in detail by means of embodiments with reference to the drawing. In the drawing shows:

FIG. 1 a schematic diagram explaining the operating principle of an ultrasonic flowmeter;

FIG. 2 a schematic diagram of a support housing of an ultrasonic flowmeter according to the invention;

FIG. 3 a perspective cross-section of the support housing according to FIG. 2;

FIG. 4 a measuring insert of an ultrasonic flowmeter according to the invention;

FIGS. 5 and 6 perspective cross-sections of the measuring insert as shown in FIG. 4 at different heights;

FIG. 7 a support housing with an inserted measuring insert in a sectional view as FIG. 3;

FIG. 8 a measuring insert of another embodiment;

FIG. 9 a support housing with inserted measuring insert, inserted flow straightener and fitted sealing cover in a sectional view as FIG. 3.

The flow meter according to the inventive subject matter works on the principle of flow measurement by means of ultrasound. This well-known measuring principle is shown in FIG. 1. A flowmeter 10 comprises at least two ultrasonic transducers 12, 14 arranged at an angle other than 90° to the flow in the wall of a conduit 16 in which a fluid 18 flows in the direction of arrow 20. The ultrasonic transducers 12, 14 operate, controlled by a control and evaluation unit 22, alternately as transmitter and receiver. The ultrasonic signals transported on a measuring path 24 through fluid 18 are accelerated in the direction of flow and decelerated against the direction of flow. Via circuit elements, not shown, such as amplifiers and A/D converters, the respective received signals are fed to the control and evaluation unit 22 and are digitally evaluated. For this purpose, the resulting time-of-flight difference is evaluated according to $$v = \frac{L}{(2\cos\alpha)\left(\frac{1}{t_h} - \frac{1}{t_r}\right)}$$

to get the desired flow velocity or according to $$\dot{Q} = v \tfrac{1}{4} D^2 \pi$$

to get the volume flow, in which the geometric conditions are described by the following variables as in FIG. 1:

v: flow velocity of the fluid in the conduit;
L: length of the measuring path between the two ultrasonic transducers;
α: angle to the flow direction at which the ultrasonic transducers transmit and receive,
Q: volume flow rate;
D: diameter of the conduit;
$t_h$: transit time of the ultrasonic signal with the flow;
$t_r$: transit time of the ultrasonic signal against the flow.

The invention now concerns the special design of the flowmeter.

The ultrasonic flowmeter 100 according to the inventive subject matter has a support housing 110, which essentially consists of a cuboid block 112 (FIGS. 2 and 3). The block 112 has a passage 114 which completely penetrates the block 112 and forms a conduit 116, with a flow direction 120. Then the support housing 110 forms the wall of the conduit 116. An inlet side 122 of the support housing 110 has threaded holes 124 on pitch circles, which are used for mounting on a flange of a fluid line, not shown. Identical threaded holes for the same purpose are provided on an output side 128 of the support housing.

Perpendicular to the conduit 116, a circular cylindrical receptacle 132 is formed from an upper side 130, the diameter Da of which is larger than the inner diameter D of the conduit 116. The receptacle 132 extends into the support housing 110 to a depth T, which encompasses the interior of the conduit 116, i.e. the free conduit cross-section. The conduit 116 and the receptacle 132 virtually cross each other.

The receptacle 132 is used for the form-fit mounting of a measuring insert 134, a first embodiment of which is shown in FIGS. 4 to 6, where FIG. 4 shows a perspective view and FIGS. 5 and 6 horizontal sections at the level of ultrasonic transducers explained below. The measuring insert 134 also has a circular cylindrical shape and fits positively into the receptacle 132 as shown in FIG. 7. The measuring insert 134 has a passage 136 perpendicular to its longitudinal cylinder direction, which forms an extension of the conduit 116 when inserted. This is also the reason why the diameter Da must be larger than D.

At least two ultrasonic transducers 140 and 142 are arranged in the wall 138 of the measuring insert 134 in such a way that in operation the ultrasonic signals emitted and received by the two ultrasonic transducers 140 and 142 on a measuring path 141 have a transit time difference $t_h$–$t_r$, which is dependent on the flow velocity v and/or the flow rate Q of a fluid flowing in the conduit. In order to be able to reach the ultrasonic transducers 140, 142 with electric cables, external grooves 126 are provided on the cylinder jacket. The electrical cables are finally led outside through a cover 144 in a way not shown.

The measuring insert 134 can be removed from the receptacle 132 as it was inserted into it. With the sealing cover 144 (FIG. 9) the receptacle can be closed pressure-tight with the measuring insert 134 inserted. To do this, the sealing cover 144 is simply placed on the top 130 and fixed in place with screws 145, which can be screwed into threaded holes 146 (FIG. 2) arranged in a circle. Sealing is preferably achieved by means of an O-ring 148, which is located in a groove 150 in a shoulder 152 of the sealing cap 144 and which, for sealing, rests on the inside against a wall of the receptacle 132.

In this arrangement, according to the inventive subject matter, the wall thicknesses of the support housing 110, i.e. the dimensions of the cuboid block 112, must only be designed so that the threads located therein are sufficiently strong and enough strength against the pressures that occur is given.

The ultrasonic transducers 140 and 142 are preferably arranged off-centre in relation to the conduit axis, e.g. as shown in FIG. 6 below and/or according to FIG. 5 above the conduit centre. Despite the presence of the ultrasonic transducers 140 and 142, this allows the smallest possible diameter Da of the mount, i.e. the smallest possible installation space.

In the embodiment of the invention shown in FIGS. 4 to 6, in addition to the two ultrasonic transducers 140 and 142, two further ultrasonic transducers 154 and 156 are provided, the further ultrasonic transducers 154 and 156 defining a second measuring path 158. Measuring paths 141 and 158 are arranged in such a way that although they lie on different levels in a side view (FIGS. 5 and 6), they cross each other in the top view. Better measurement results can be achieved by arranging measurement paths 141 and 158 in this way.

Further arrangements of the measuring paths are conceivable and useful for certain purposes. Such an arrangement is shown in FIG. 8 according to which ultrasonic transducers 140', 142', 154' and 156' are located in a measuring insert 143' in a reflection arrangement. This means that the assigned measurement paths, one of which is shown in FIG. 8, do not run in a straight line, but the ultrasonic signals are reflected at least once on the wall between transmission and reception. This allows the length of the measuring path to be increased, which can be an advantage in signal processing when separating the signals. It should be mentioned that FIG. 8 is only roughly schematic. For example, the curves are not executed, but shown as polygons. Further details, such as the external grooves for electrical cables are also missing. FIG. 8 is only intended to show the possible arrangement of ultrasonic transducers with measuring paths in reflection.

In a further embodiment of the invention, a flow straightener 160 is provided on the inlet side in the conduit 116 (FIG. 9). This can be designed as a simple insert, which is pushed in on the inlet side and secured against slipping in the direction of flow by a stop 162. The flow straightener 160 has baffle plates 164 running in the direction of flow and/or, if necessary, a perforated plate 166 at right angles to the flow.

The invention claimed is:

1. An ultrasonic flowmeter comprising a conduit (116) in a support housing (110), the support housing (110) forming the conduit wall, and at least two ultrasonic transducers (140, 142) arranged in such a way that in operation the emitted and received ultrasonic signals have a difference in transit time dependent on the flow velocity and/or the flow rate of a fluid flowing in the conduit (116), wherein the ultrasonic transducers (140, 142) are provided in a measuring insert (134) which can be inserted and removed perpendicular to the conduit into the support housing (110) and the conduit (116), whereby for introducing the measuring insert (134), the conduit (116) has, perpendicularly to the direction of flow (120), a circular cylindrical receptacle (132) with a diameter (Da) which is greater than the inside diameter (D) of the conduit (116) and has a depth (T) which encompasses the interior of the conduit (116), and whereby the measuring insert (134) fits positively into the receptacle (132) and has a passage (136) which, when inserted, forms an extension of the interior of the conduit (116), characterized in that four ultrasonic transducers (140, 142, 154, 156) are provided in a wall (138) of the measuring insert (134), the transducers (140, 142, 154, 156) define at least two measuring paths (141, 158), said measuring paths (141, 158) crossing each other in top view and the transducers (140, 142, 154, 156) are arranged in the wall (138) of the measuring insert (134) in such a way that in operation the ultrasonic signals emitted and received by the ultrasonic transducers on the measuring paths have a transit time difference ($t_h-t_r$) which is dependent on the flow velocity (v) and/or the flow rate (Q) of a fluid flowing in the conduit (116).

2. The ultrasonic flowmeter according to claim 1, characterised in that the receptacle (132) can be closed in a pressure-tight manner with a cover (144) in a flangeless manner, for which purpose the support housing (110) has threaded bores (146).

3. The ultrasonic flowmeter according to claim 2, characterized in that a sealing ring (148) of the cover (144) rests on the inside against a wall of the receiver (132).

4. The ultrasonic flowmeter according to claim 1, characterized in that the ultrasonic transducers (140, 142, 154, 156) are arranged off-center with respect to a conduit axis.

5. The ultrasonic flowmeter according to claim 1, characterized in that the ultrasonic transducers (140, 142, 154, 156) are arranged in a reflective arrangement.

6. The ultrasonic flowmeter according to claim 1, characterized in that the conduit (116) has a flow conditioner (160) on the inlet side.

7. The ultrasonic flowmeter according claim 1, characterized in that for the installation of the measuring device (100) in a fluid line, the support housing (110) can be mounted on the input and output side directly on flanges of the fluid line.

\* \* \* \* \*